No. 833,827. PATENTED OCT. 23, 1906.
J. DAWKINS.
COIL SPRING TRAP.
APPLICATION FILED JUNE 14, 1906.

WITNESSES:  James Dawkins, INVENTOR.
By C. A. Snow & Co.
ATTORNEYS

UNITED STATES PATENT OFFICE.

JAMES DAWKINS, OF YAGER, CALIFORNIA.

COIL-SPRING TRAP.

No. 833,827.  Specification of Letters Patent.  Patented Oct. 23, 1906.

Application filed June 14, 1906. Serial No. 321,729.

*To all whom it may concern:*

Be it known that I, JAMES DAWKINS, a citizen of the United States, residing at Yager, in the county of Humboldt and State of California, have invented a new and useful Coil-Spring Trap, of which the following is a specification.

The present invention relates to animal-traps of the type commonly designated "jaw-traps," and it relates more particularly to the construction of the spring or springs for actuating the jaws.

One of the objects of the invention is to so construct the springs that they serve as feet by which the trap as a whole can be stably supported, thereby reducing to a minimum the liability of the trap being overturned accidentally by an animal or snapped without entrapping the same.

A further object is to construct the springs so that they will have in addition to their principal function of snapping the jaws the function of imparting to the trap an upward movement during the act of snapping, so as to grip the leg of an animal at a point higher than is possible with jaw-clamps as usually constructed; and another object is to provide a trap of this character which is impossible of closing except by an animal touching the treadle or pan thereof and in which the springs are of such a nature that they can be readily hidden or covered from view of the animal.

With these objects in view and others, as will appear as the nature of the invention is better understood, the same comprises various novel features of construction and arrangement of parts, to be hereinafter fully described, and set forth with particularity in the claims appended hereto.

Figure 1:
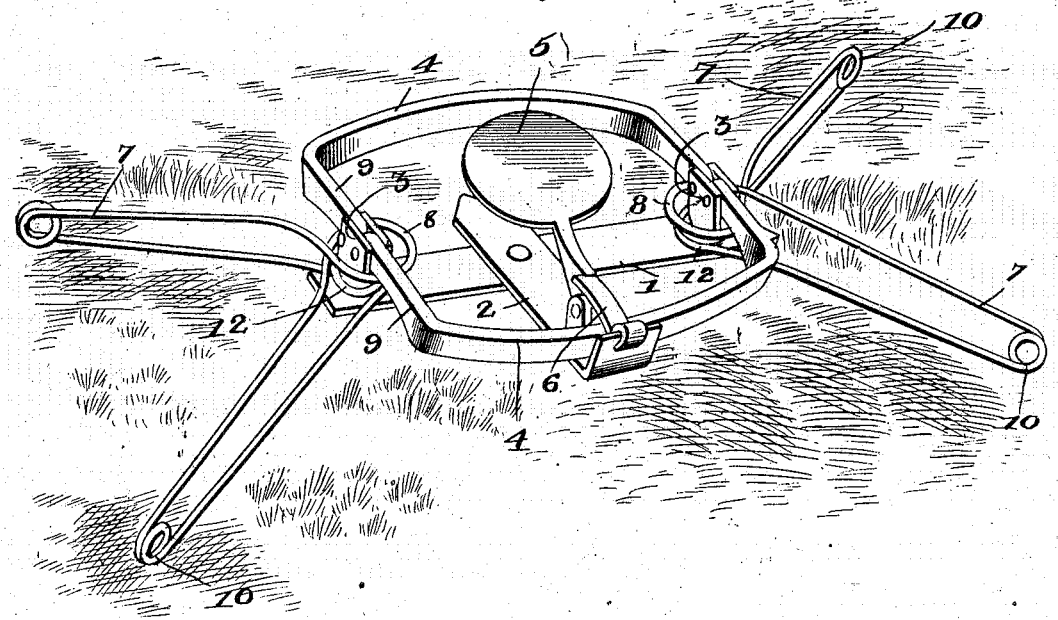
Figure 2:
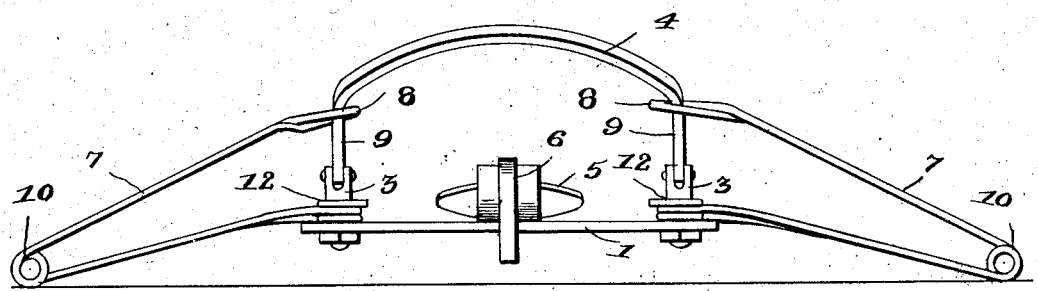

In the accompanying drawings, which illustrate one of the embodiments of the invention, Figure 1 is a perspective view of the trap, showing the same in set position. Fig. 2 is a side elevation of the jaws in closed position.

Corresponding parts in both figures are indicated throughout by similar characters of reference.

Referring to the drawings, 1 represents a base-plate of a trap to which is secured the centrally-arranged cross-plate 2 and the end standards 3. Pivoted on the standards are the jaws or gripping members 4 of the trap. Pivoted on the cross-plate is the pan or treadle 5, that is held in raised position by the latch 6. These parts constitute a well-known construction and form none of the novel features of the present invention except in so far as they combine with the special form of springs hereinafter to be described.

Extending from one or both ends of the base-plate are radiating legs by which the trap is supported on the ground. Hitherto it has been the custom to place the trap so as to rest with the base-plate thereof on the ground. As this forms a very narrow base for the trap, the latter was subject to being readily turned over by an animal accidentally striking the same. These legs are preferably formed by the springs that actuate the jaws of the trap. Each spring comprises, preferably, a single length of wire 7 of suitable gage and resiliency and plated with a non-corrosive plating, so as to endure the action of the elements. Each wire is turned at its center into an eye 8, that is disposed so as to engage around the upright portions 9 of the jaws. From the ring each half of the wire extends outwardly and downwardly to a suitable distance, where it is coiled, as indicated at 10, to increase the elasticity of the spring. From the coiled portion 10 of each half of the spring the wire continues back to the standard and is secured thereto by the eye 12, formed at the terminal of the wire. By this construction a single piece of wire constitutes two of the supporting-legs, and the entirety constitutes a spring formed of two V-shaped portions lying one above the other and connected by the coils 10. The upper V-shaped portion of the spring readily yields, so as to permit the jaws of the trap to be opened, and are held under tension by the latter. When the latch of the trap is opened by the pan being depressed, the springs operate to quickly snap the jaws.

As shown in Fig. 2, the outer ends of the legs rest on the ground, so that the trap has a large and effective supporting-base, thus making it comparatively stable, and at the same time being yieldingly or resiliently supported it cannot be sprung or tipped over by the animal stepping on the jaw. Moreover, when an animal steps on the treadle the entire body of the trap is depressed to release the jaws; but even though the weight of the animal should be removed immediately from the treadle in an effort to avoid the consequences of releasing the jaws, and no matter how quick this action on the part of the animal may be the yielding supports will cause the trap to rise, and thus follow the foot of the animal and grip the leg as high as though the foot had been allowed to remain on the treadle with the weight imposed thereon. The yielding feature, in other words, causes the jaw to follow the leg of the animal and insure a hold which will be effective, whereas with a stationary trap, or one which is not adapted to yield in the way indicated, the movement of the foot of the animal after touching the treadle may be so quick as to withdraw it almost, if not entirely, from the path of the jaws.

From the above description it will be seen that the springs, while being of the best construction to perform the functions described, also permit of their being readily concealed from view by reason of their skeleton-like structure, whereby they can be buried in grass, leaves, or the like.

I have described the principle of operation of the invention, together with the apparatus which I now consider to be the best embodiment thereof; but I desire to have it understood that the apparatus shown is merely illustrative and that the invention can be carried out by other means.

What is claimed is—

1. An animal-trap, comprising a supporting structure, jaws mounted thereon, a device for locking the jaws open, and relatively stationary legs extending outwardly in such a relation to the structure as to support the same close to the ground.

2. An animal-trap, comprising a supporting structure, jaws mounted thereon, a device for locking the jaws open, and resilient members forming permanent legs for supporting said structure at opposite ends.

3. An animal trap, comprising a supporting structure, jaws mounted thereon, a device for locking the jaws open, and a pair of legs at each end of the structure and extending permanently therefrom in an outward direction close to a horizontal plane for increasing the effective base of the trap.

4. An animal-trap comprising a supporting structure, jaws mounted thereon, a device for locking the jaws open, and a wire device for closing the jaws and supporting the said structure.

5. An animal-trap, comprising a supporting structure, jaws mounted thereon, a device for locking the jaws open, and a spring attached to the supporting structure which closes the jaws and forms supporting-legs extending outwardly from one end of the said structure.

6. An animal-trap comprising a supporting structure, jaws mounted thereon, a device for locking the jaws open, and a spring composed of a single length of wire bent into two V-shaped portions, one of which is attached to the structure and the other free for closing the jaws.

7. An animal-trap comprising a supporting structure, spaced standards, jaws mounted on the standards, a locking device for the jaws, and a spring for actuating the jaws comprising a single piece of wire having its central portion arranged in coöperative relation to the jaws, and its ends attached to the supporting structure with the body portion bent into the form of a V.

8. In an animal-trap of the jaw type, a spring comprising a single length of wire bent into two substantially similar portions each forming legs, and coils connecting the two portions.

9. In an animal-trap of the jaw type, a spring comprising a single length of wire bent into two substantially similar portions forming two diverging legs, coils at the outer ends of the legs connecting the portions, and an eye on one of said portions for engaging the jaws of the trap.

10. In an animal-trap of the jaw type, a spring comprising a single length of wire bent into two superposed V-shaped portions connected at their ends by coils, an eye on one of the portions for actuating the jaws of the trap, and means on the other portion for attaching the spring to the trap.

11. In an animal-trap, a pair of jaws, an elastic supporting means for the jaws arranged and adapted to yield downwardly when the jaws are open, a treadle, and a device coöperating with the treadle for releasably holding the jaws open.

In testimony that I claim the foregoing as my own I have hereto affixed my signature in the presence of two witnesses.

JAMES DAWKINS.

Witnesses:
J. S. BURNELL,
LIZZIE BARRY.